UNITED STATES PATENT OFFICE.

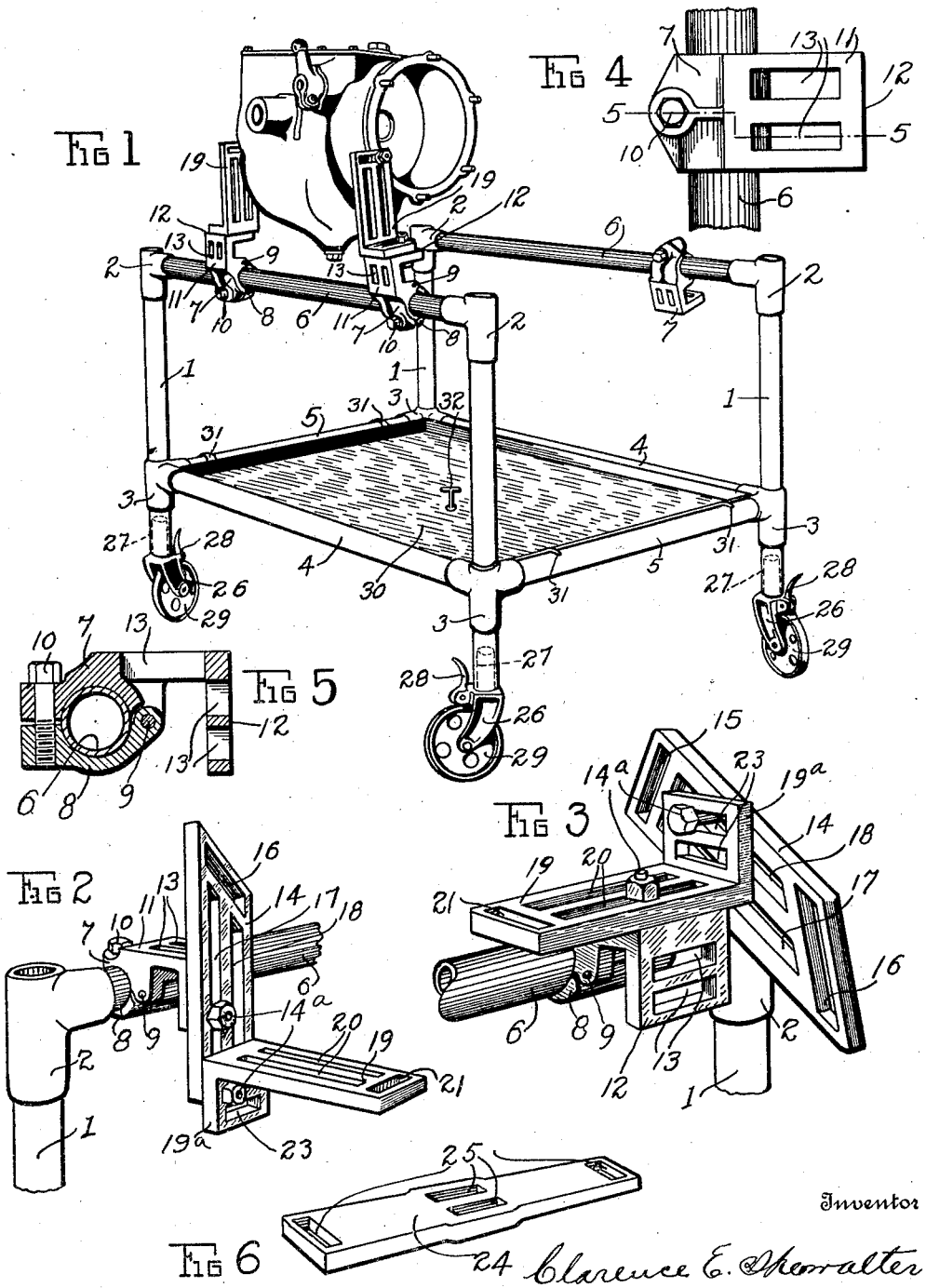

CLARENCE E. SHEWALTER, OF SPRINGFIELD, OHIO.

SUPPORTING-STAND.

1,363,020.  Specification of Letters Patent.  Patented Dec. 21, 1920.

Application filed January 15, 1917. Serial No. 142,521.

*To all whom it may concern:*

Be it known that I, CLARENCE E. SHEWALTER, a citizen of the United States, residing at Springfield, in the county of Clark and State of Ohio, have invented certain new and useful Improvements in Supporting-Stands, of which the following is a specification.

This invention relates to improvements in motor-supporting stands, and more particularly to that class of stands intended for use in supporting motors, transmissions, gear-cases, or axles when removed from automobiles.

The object of this invention is to devise a stand that will have adjustable features, so that various types of motors or transmission may be properly and securely supported therein, and the necessary work may be done with greater ease and accessibility.

Heretofore it has been necessary to use makeshift or temporary devices to support motors when removed from the frame but by the use of the various peculiarly shaped members comprising this stand, it is possible to support any type of motor in a secure and substantial manner.

Figure 1 is a perspective view of a stand, showing a transmission and clutch case securely bolted therein.

Figs. 2 and 3 are perspective views of some of the parts of the device showing some of the various combinations obtainable.

Fig. 4 is a top plan of one of the slidable clamps and a portion of an upper rail.

Fig. 5 is a section on line 5—5 of Fig. 4.

Fig. 6 is a perspective view of one of the members of the stand.

In Fig. 1 the stand proper is formed of vertical lengths 1—1—1—1 of tubing, preferably steel, upper corner castings, 2—2—2—2 and lower corner castings 3—3—3—3, of any suitable material, lower rails 4—4, end connections 5—5 and upper side rails 6—6, the latter preferably of smooth finished steel tubing. The frame is secured together by any suitable means.

Slidably mounted on the upper rails 6—6 are clamping members 7—7—7: in actual practice there are four of these clamps, but only three are shown in Fig. 1. These clamps are preferably of malleable iron, and have a hinge member 8 which is pivoted to the main body of the clamp by a pin 9; a screw 10 passes through the ear on the main body of the clamp and is threaded into a similar ear of the hinge member 8 and serves to securely bind the clamp at any desired position or angle. These clamps are also provided with a face 11 and a similar face 12 at right angles to face 11. These faces are slotted as at 13, to allow bolts to be passed through; the slots in the face 11 lying in a plane at right angles to the longitudinal axis of the upper side rails 6—6, while the slots in the faces 12 are parallel with the longitudinal axis of the rails.

The slotted plates or grids 14—14—14—14 of which there are four furnished with each frame although more may be furnished or used therewith, are adapted to be bolted to either of the faces 11 or 12 as by bolts 14$^a$ in Fig. 2 and at any angle or position desired. One end of the plates 14 is formed at right angles to the longest dimension of the plate and has a slot 15 close to the square end and parallel with same, while the other is formed at an angle, preferably 45°, with the long dimension and has a slot 16, similarly parallel with the angular end.

Slots 17 and 18 are spaced between the outer sides of the plates and between the slots 15 and 16.

The plates 19—19, two being preferably furnished with each stand having an end portion 19$^a$ turned preferably at right angles to the main body portion of said plates are likewise provided with longitudinal slots 20—20 in the flat portion, and a transverse slot 21 parallel and in close proximity to the end of the flat portion, and also slots 23 transversely disposed in the turned portion.

There is also a flat member 24 preferably a steel casting, provided with slots 25 suitably arranged therein. All these plates 14, 19, and 24 are adapted to be bolted to the clamping members 7, on either of the faces 11 and 12, making possible a very wide range of combinations, whereby some arrangement may be effected that will be found useful in supporting motors, of radically different types or models.

The stand is supported on removable casters 26, of which there are four for each stand, interchangeably fitted so as to be inserted in the lower ends of the vertical corner pieces 1—1—1—1, as shown by dotted line 27, a lock 28 being adapted to bear against the wheel 29 when it is desired to prevent the stand from moving about.

There is also an oil-drip pan 30 carried on brackets or pan hooks 31—31—31—31 on the end connections 5—5, useful in catching excess oil and offering a convenient place for laying tools, etc. A central drain opening 32 is provided whereby the pan may be drained into a pail placed beneath the pan.

In use, when a motor, transmission, axle, or a similar unit is to be supported in the stand, measurements of the unit are preferably taken first, and by arranging the various shaped brackets, plates, etc., in a suitable manner, points of support closely approximating those in the chassis of the car upon which the said unit normally rests, are provided, and when the unit is placed on these points of support and firmly bolted or clamped thereto, it will be held as securely as in the chassis itself.

Thus is will be seen, that while some motors or other units may be placed directly on the brackets 7 themselves, with other types it may be found necessary to use one or more of the plates 14, or 19 or the flat bar 24, or all of said parts; in any event a suitable arrangement is easily and quickly provided, and it has been found in actual use, that these various peculiarly shaped members are sufficient to accommodate any type of motor.

Having thus described my invention, I claim—

1. In a stand of the character described, a main frame having non-adjustable horizontal rails, adjustable spaced-apart brackets on said rails, each of said brackets having a plurality of faces arranged at an angle to each other, each face having points of attachment to receive securing devices.

2. In a stand of the character described, a main frame having non-adjustable horizontal rails, spaced-apart brackets on said rails longitudinally and axially adjustable thereon, said brackets having points of attachment to receive securing devices.

3. In a stand of the character described, a frame having non-adjustable horizontal rails, a series of spaced-apart brackets on said rails longitudinally and axially adjustable with respect thereto, each bracket having a plurality of faces with points of attachment to receive securing devices thereon.

4. In a stand of the character described, a frame having horizontal rails, a series of brackets adjustably secured to said rails, said brackets having a plurality of faces, and plates arranged to be adjustably secured to said faces, said plates having adjustable points of attachment for the structure to be supported.

5. In a stand of the character described, a main frame having non-adjustable horizontal rails, adjustable spaced-apart brackets on said rails, each bracket having a plurality of faces, provided with slotted openings to form points of attachment arranged to receive securing devices.

6. In a stand of the character described, a frame having horizontal rails, a series of brackets adjustably secured to said rails, said brackets having slotted openings, and plates having slotted openings, and securing devices arranged to be inserted in said slotted openings to adjustably secure said plates to said brackets or each other.

7. In a stand of the character described, a main frame having horizontal rails, adjustable brackets on said rails, each of said brackets having a plurality of faces provided with slotted openings, the openings in one face extending at right angles to the openings in the other face, and a series of plates, each plate being provided with slotted openings some of which are arranged at an angle to the others, and securing devices for securing said plates to said brackets through said slotted openings.

8. In a stand of the character described, a main frame having horizontal rails, adjustable brackets on said rails, each bracket formed with a plurality of faces having slotted openings, a series of plates, each plate having a plurality of faces having slotted openings, and devices for securing said plates to said brackets through said slotted openings.

9. In a stand of the character described, a frame having horizontal rails, a series of brackets adjustably secured to said rails, said brackets having slotted openings, plates having slotted openings together with means for securing said plates to said brackets through said slotted openings, and a second series of plates having openings together with means for securing said second series of plates to said first mentioned plates through said openings.

In testimony whereof, I have hereunto set my hand this 13th day of January, 1917.

CLARENCE E. SHEWALTER.

Witness:
CHAS. I. WELCH.